(No Model.)

J. DARLING.
DEVICE FOR STARTING VEHICLES.

No. 544,088. Patented Aug. 6, 1895.

Witnesses
Chas. K. Davis.

Inventor
John Darling
By W. H. Bartlett
Attorney

United States Patent Office.

JOHN DARLING, OF LONDON, ENGLAND, ASSIGNOR OF ONE-HALF TO LEONIDAS H. CRESS, OF NEWTON, MASSACHUSETTS.

DEVICE FOR STARTING VEHICLES.

SPECIFICATION forming part of Letters Patent No. 544,088, dated August 6, 1895.

Application filed December 29, 1894. Serial No. 533,327. (No model.)

*To all whom it may concern:*

Be it known that I, JOHN DARLING, a citizen of England, and a resident of 13 Golden Square, London, England, have invented certain new and useful Improvements in Devices for Starting Vehicles, of which the following is a specification.

This invention relates to starting devices for vehicles.

The object of this invention is to produce a starting device for vehicles, in which the draft of the team may act with leverage on one or more of the wheels to cause the same to start or rotate; and the invention consists in the construction and combination of parts by which this result is effected.

Figure 1:
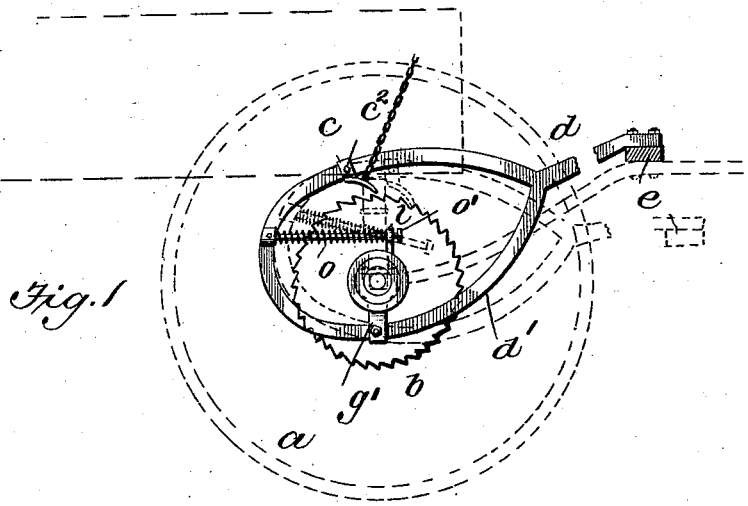
Figure 2:
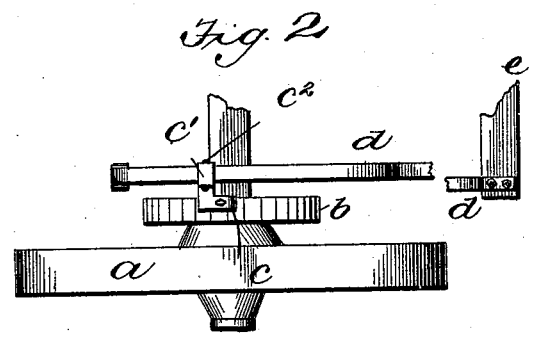
Figure 3:
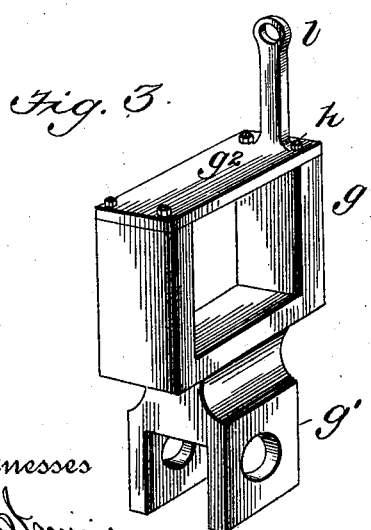
Figure 4:
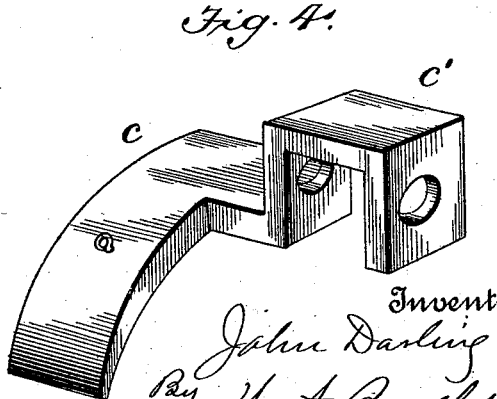

Figure 1 is a side elevation of so much of the apparatus as is necessary for a general understanding of the device, the wheel-starter and connections being shown in full lines, but part broken away, and the wagon and the working position of the starter being sufficiently indicated by dotted lines. Fig. 2 is a broken top plan of a wheel, axle, and the essential parts of the starter. Fig. 3 is an enlarged perspective of a yoke which may be used to support the starter on the axle. Fig. 4 is an enlarged perspective of the operating pawl.

The letter $a$ indicates one of the wheels of a vehicle—preferably the front wheel—and $b$ denotes a ratchet firmly connected to or integral with the hub of said wheel. Preferably a ratchet will be applied to both front wheels, and the starting device will be duplicate; but a full understanding will be had from the description of the device as applied to one wheel of a vehicle.

A pawl $c$ is placed in position to engage the teeth of ratchet $b$ under proper conditions. The pawl $c$ is connected to a lever $d$, preferably by an extension $c'$ of the pawl embracing the upper portion of lever $d$, a pin $c^2$ serving to connect the pawl to the lever and permitting a slight rocking of the pawl.

The general relation of parts is clearly shown in Figs. 1 and 2, but is subject to modification within the skill of expert mechanics.

The lever $d$ is shown as having two branches forming an ellipse or loop which surrounds the axle. The lower branch or arm $d'$ is pivoted to the arm $g'$ of a bracket $g$, which bracket is rigidly secured to the polygonal axle, as by means of a plate $g^2$ and retaining-bolts $h$. The bracket $g$ or its cap has a rigid projecting arm $l$, which arm supports a spring $o$, which spring bears against lever $d$ and normally tends to swing said lever up at its front end and disengage the pawl $c$ from ratchet-wheel $b$. A guide-rod $o'$ connected to the bend of lever $d$ and to the rigid arm of the bracket may be used to support spring $o$ in the usual manner.

The front end of lever $d$ is connected either to the splinter-bar $e$ or to the whiffletree, pole, or other traction-bar of the vehicle, in such manner that the spring $o$ shall tend to lift the front end of lever $d$ and its connection when said spring acts to rock the lever on its pivot, and lift pawl $c$ out of engagement with ratchet $b$, as such a connection would normally do.

The device having been arranged in substantially the manner shown and described, the lever $d$ will be rocked and the splinter-bar will be lifted by the action of spring $o$, when the vehicle is moving under normal or light draft; but in case of heavy draft the splinter-bar $e$ will be drawn down by the pulling of the team, and the lever $d$ will be rocked on its pivotal support. This brings the pawl $c$ into engagement with the teeth of ratchet $b$ and tends to turn the wheel-hub and wheel. As the wheel turns, the pawl will yield to permit the teeth to pass, and as soon as the vehicle moves under light traction the pawl will be raised from the ratchet by the action of spring $o$ on the lever $d$.

A chain or cord $r$ may be connected to pawl $c$, by which the driver may be enabled to lift the pawl $c$ from the ratchet when he desires to do so.

It will be understood that changes within the limits of the scope of the claims are warranted by my invention.

What I claim is—

1. In combination with the hub of a wheel and a ratchet connected thereto, a lever supported from the axle of said wheel and having a pawl in position to engage said ratchet when the lever is rocked, and the traction bar connected to said lever, substantially as described.

2. In combination with the axle of a vehicle, a yoke fixed thereto, a looped lever pivoted to said yoke at one side of the axle and rocked on said pivot by a spring at the other side, a pawl carried by the lever and a ratchet with which said pawl engages connected to the hub of the vehicle wheel, and the traction bar connected to said lever, all substantially as described.

3. In a vehicle starting apparatus the combination of the wheel, hub, and ratchet wheel connected to the hub, of a looped lever supported by the axle, a pawl on said lever in position to engage said ratchet when the lever is rocked, and the traction device connected to said lever, all substantially as described.

4. The combination with the wheel, hub, and ratchet wheel thereon, of the looped lever having a pawl in position to engage said ratchet, and the spring connected to the axle and to one arm of the looped lever, all substantially as described.

Signed at London, in the county of London, England, this 22d day of November, 1894.

JOHN DARLING.

Witnesses:
H. A. WOODBRIDGE,
J. M. A. BARBER.